United States Patent
Kuwabara

(10) Patent No.: US 8,647,223 B2
(45) Date of Patent: Feb. 11, 2014

(54) V-BELT

(75) Inventor: Shinya Kuwabara, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 164 days.

(21) Appl. No.: 13/201,700

(22) PCT Filed: Mar. 13, 2009

(86) PCT No.: PCT/JP2009/054886
§ 371 (c)(1),
(2), (4) Date: Aug. 16, 2011

(87) PCT Pub. No.: WO2010/103656
PCT Pub. Date: Sep. 16, 2010

(65) Prior Publication Data
US 2011/0300980 A1    Dec. 8, 2011

(51) Int. Cl.
*F16G 5/16* (2006.01)
(52) U.S. Cl.
USPC .......................................................... 474/242
(58) Field of Classification Search
USPC .......................................... 474/238, 246, 247
See application file for complete search history.

(56) References Cited

U.S. PATENT DOCUMENTS

| | | | |
|---|---|---|---|
| 4,915,677 A | | 4/1990 | Simon |
| 6,440,024 B1 * | | 8/2002 | Kobayashi ..................... 474/242 |
| 2007/0072721 A1 | | 3/2007 | Takagi et al. |
| 2008/0274848 A1 | | 11/2008 | Van Der Leest et al. |

FOREIGN PATENT DOCUMENTS

| | | |
|---|---|---|
| JP | 57-65444 | 4/1982 |
| JP | 64 65347 | 3/1989 |
| JP | 6-307510 | 11/1994 |
| JP | 07 083315 | 3/1995 |
| JP | 7-083315 A * | 3/1995 |
| JP | 2002-276740 | 9/2002 |
| JP | 2006 307958 | 11/2006 |
| JP | 2008 523335 | 7/2008 |
| WO | 2005 019684 | 3/2005 |

OTHER PUBLICATIONS

English Machine Translation of JP 7-083315 A.*
International Search Report issued Jun. 16, 2009 in PCT/JP09/054886 filed Mar. 13, 2009.

* cited by examiner

*Primary Examiner* — William E Dondero
*Assistant Examiner* — Diem Tran
(74) *Attorney, Agent, or Firm* — Oblon, Spivak, McClelland, Maier & Neustadt, L.L.P.

(57) ABSTRACT

A durable V-belt formed by fastening plate-like elements juxtaposed annularly using a ring. The element comprises a saddle face on which the ring is disposed, columns extending radially outwardly from lateral ends of a saddle face, and flank faces formed on lateral ends of the column to be contacted with a groove of a V-pulley to transmit power. An angle between outer circumferential portions of the flank faces is substantially identical to or smaller than an open angle of the groove of the V-pulley; and an angle between inner circumferential portions of the flank faces is larger than the angle between the outer circumferential portions.

13 Claims, 2 Drawing Sheets

V-BELT

TECHNICAL FIELD

This invention relates to a V-belt formed by fastening a plurality of plate-like elements in a circular manner by a band-like ring.

BACKGROUND ART

A push type driving belt to be used in a belt type continuously variable transmission is known in the prior art. The driving belt of this kind is formed by annularly juxtaposing a plurality of plate member called an "element" or a "block" in a same orientation, and by fastening the juxtaposing plate members by an annular member such as a band, a hoop and a ring (as will be called a "ring" hereinafter). Both side faces of the element are inclined in accordance with an inclination of a V-groove formed between sheaves of a pulley to have a V-shaped cross-section or a trapezoidal cross-section. The side faces of the element thus inclined are contacted individually with an outer face of the V-groove to serve as a flank face when the element enters into the V-groove. Therefore, in a V-belt thus structured, power is transmitted frictionally between the pulley and the ring by a wedge action between the outer face of the V-groove of the pulley and the flank face of the element.

One example of the above-explained V-belt is disclosed in Japanese Patent Laid-Open No. 1-65347. According to the V-belt taught by Japanese Patent Laid-Open No. 1-65347, a transverse element (i.e., an element) of general trapezoidal shape is formed with a base and fins slanted with respect to the base. A plurality of the transverse elements thus formed are joined together by an elastomer mass through a longitudinal reinforcement(s).

According to the example taught by Japanese Patent Laid-Open No. 1-65347, an angle of lateral sides of inner edge of each transverse element (i.e., the flank face) is slightly greater than a slant angle of interior walls of pulleys (i.e., opening angle of the V-groove).

Therefore, according to the teachings of Japanese Patent Laid-Open No. 1-65347, a recess opening toward an outer circumferential side is formed at the width center of the transverse element. In case of applying the V-belt using this kind of the elements to the belt type continuously variable transmission, a radial load is applied to the element by a tension of the ring and a clamping force is applied to the element by the pulley, under the situation in which the V-belt is pushed by a thrust force of the pulley to drive the continuously variable transmission. In this situation, the element is compressed elastically widthwise. As a result, an angle between the flank faces is reduced to be narrower than an initial angle, and a contact point between the flank face and the outer face of the V-groove is displaced toward inner circumferential side from an initial contact point. Consequently, the elements are off-balanced in the pulley, and a torque capacity between the pulley and the V-belt is thereby degraded. Moreover, durability of the V-belt may be deteriorated. In order to avoid the above-explained disadvantages, according to the transverse element taught by Japanese Patent Laid-Open No. 1-65347, the angle between the flank faces of the transverse element is widened to be slightly greater than an open angle of the V-groove of the pulley.

However, if the angle between the flank faces is thus wider than the open angle of the V-groove, the element is to be clamped by the pulley unevenly only at its upper portion (i.e., at the outer circumferential side) until the angle between the flank faces becomes congruent with the open angle of the V-groove as a result of elastic deformation. In this situation, columns protruding from side ends of the element toward the outer circumferential side on which the flank face is formed individually are subjected to a bending moment to be bent inwardly (i.e., toward the width center). As a result, durability of the element, that is, durability of the V-belt is deteriorated. Therefore, the conventional V-belt has to be improved to enhance its durability.

DISCLOSURE OF THE INVENTION

The present invention has been conceived noting the technical problems thus far described, and its object is to improve durability of the V-belt.

In order to achieve the above-mentioned object, according to the present invention, there is provided a V-belt, comprising: a plate-like element having a saddle face, a column extending radially outwardly from each lateral end of the saddle face, and a flank face formed on each lateral end of the column to be contacted with a groove of a V-pulley to transmit power; and a ring disposed on the saddle face to fasten an array of the elements being juxtaposed annularly in a manner to orient the saddle face to an outer circumferential side, characterized in that: an angle between outer circumferential portions of the flank faces of the element is substantially identical to or smaller than an open angle of the groove of the V-pulley; and an angle between inner circumferential portions of the flank faces of the element is larger than the angle between the outer circumferential portions of the flank faces of the element.

According to the present invention, at least the inner circumferential portion of the flank face is formed in a manner to be contacted with the groove of the V-pulley planewise under the situation in which the element is deformed by a load from the V-pulley.

Specifically, the flank face is a wavy face in which a convex face and a concave face are formed alternately in a longitudinal direction between an outer circumferential end and an inner circumferential end of the flank face. In the wavy face thus formed, only a curvature of the convex face formed at a boundary between the outer and the inner circumferential portions of the flank face is larger than those of the other convex faces.

In addition, a level of the boundary between the outer and the inner circumferential portions of the flank face is situated at a same level as the saddle face in the radial direction.

Thus, according to the present invention, an inclination of the flank face of the element at the outer circumferential portion is substantially identical to or slightly smaller than that of the groove of the V-pulley. Therefore, the outer circumferential portion of the flank face can be contacted with the groove of the V-pulley planewise under the situation in which the element of the V-belt is compressed widthwise by the V-pulley. For this reason, the flank face will not be subjected to the load from the V-pulley unevenly so that the columns of the element can be prevented from being subjected to a significant bending moment.

In addition, since the inclination of the flank face at the outer circumferential portion is thus substantially identical to or slightly smaller than that of the groove of the V-pulley, the element being inserted into the groove of the V-pulley is contacted initially with the groove of the V-pulley at the outer circumferential portion of the flank face where a bending rigidity or flexibility is high. Therefore, an impact resulting from a contact of the element with the groove of the V-pulley can be mitigated or absorbed. For this reason, vibrations resulting from driving the V-belt can be reduced.

Meanwhile, an inclination of the inner circumferential portion of the flank face is slightly larger than that of the groove of the V-pulley. Therefore, after the outer circumferential portions of the element are compressed widthwise, the inner circumferential portion of the flank face is eventually contacted with the groove of the V-pulley planewise. For this reason, even if the element is deformed by the load from the V-pulley, the flank face can be prevented from being contacted unevenly with the groove of the V-pulley, and stress concentration on the flank face can be relaxed. Thus, according to the present invention, the durability of the V-belt can be improved by preventing deterioration of the durability of the element.

That is, the inner circumferential portion of the flank face of the element is formed to be contacted with the groove of the V-pulley planewise when the outer circumferential portion of the element is compressed by a load applied from the V-pulley. Therefore, as explained above, the flank face can be prevented from being contacted unevenly with the groove of the V-pulley so that the stress concentration on the flank face can be relaxed even after the compressive deformation of the element.

In addition, in order to hold lubricant oil between the flank face and the groove of the V-pulley, a wavy face is formed on the flank face by forming a plurality of grooves on the flank face in thickness direction. As described, the inclination of the flank face of the element is changed at the boundary between the outer circumferential portion and the inner circumferential portion. Therefore, the boundary portion of the flank face is subjected to uneven load from the V-pulley, and a stress is concentrated to the boundary portion. However, the convex face at the boundary portion is formed to have a larger curvature than that of the other convex faces. Therefore, a contact pressure between the flank face and the groove of the V-pulley can be reduced so that the durability of element is prevented from being deteriorated.

In addition, the element is subjected to the maximum bending moment at a base portion of the column at a level of the saddle face, under the situation in which the load is applied to the element from the V-pulley. However, according to the element to which the present invention is applied, the level of the boundary between the outer and the inner circumferential portions of the flank face is situated at a same level as the saddle face in the radial direction. Therefore, the base portion of the column can be prevented from being subjected to the highest bending moment and uneven load, and the stress concentration at the base portion of the column can be relaxed, even if the inclination of the flank face is changed at the boundary between the outer and the inner circumferential portions, or the wavy face is formed on the flank face.

BEST MODE FOR CARRYING OUT THE INVENTION

Figure 1:
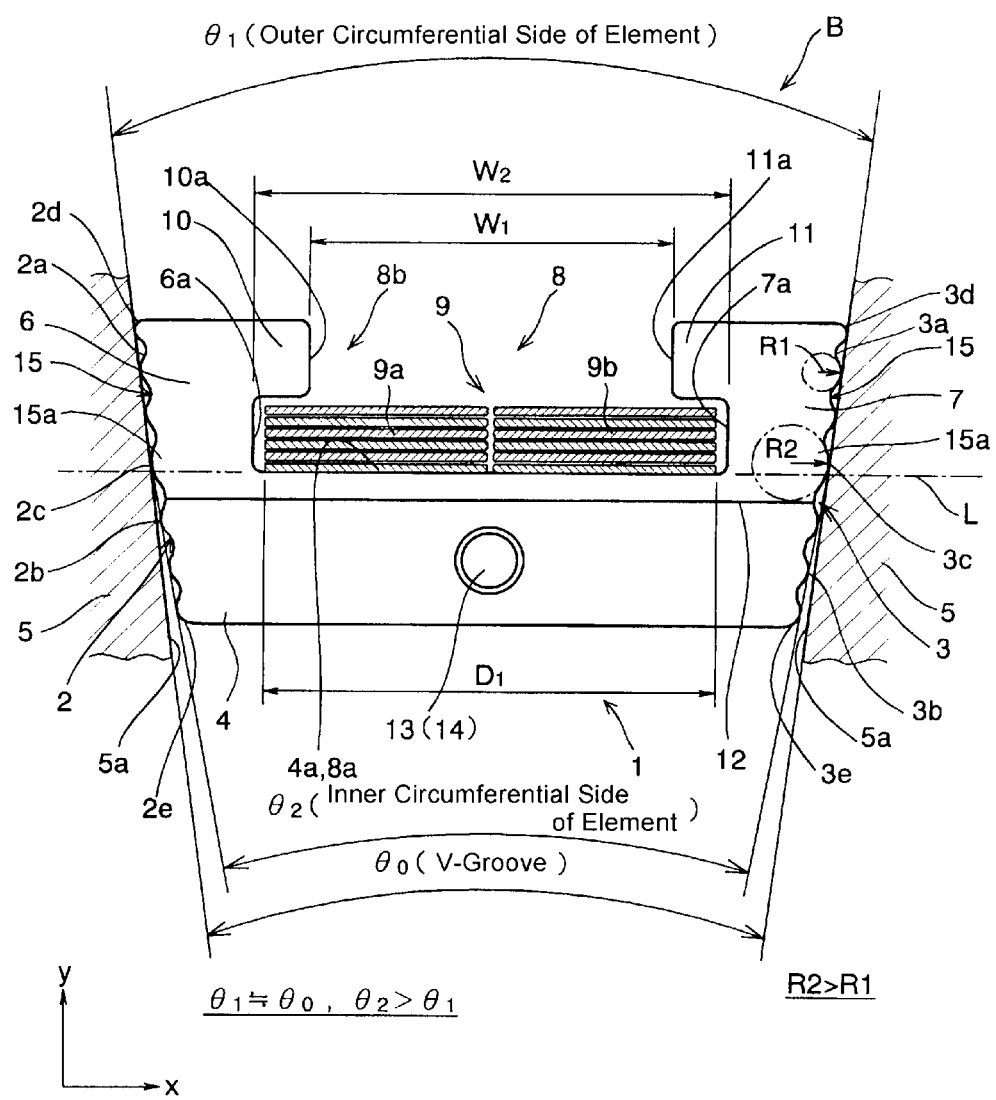
FIG. 1 is a front view schematically showing one example of the V-belt and the element according to the present invention.
Figure 2:
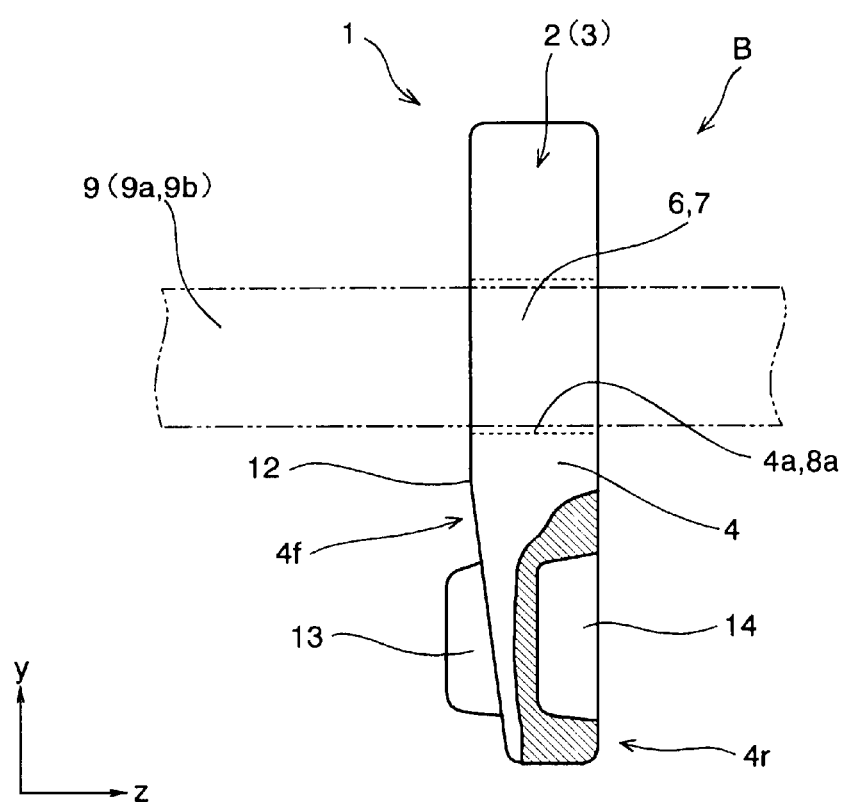
FIG. 2 is a side view (or partial sectional view) schematically showing one example of the V-belt and the element according to the present invention.

Next, an example of the present invention will be explained with reference to the accompanying drawings. First of all, structures of an element and a ring will be explained with reference to FIGS. 1 and 2. For example, the V-belt B shown in FIGS. 1 and 2 is used in a belt-type continuously variable transmission. Specifically, the V-belt B is applied to grooves of a drive pulley (i.e., an input shaft pulley) and a driven pulley (i.e., an output shaft pulley) to transmit a torque therebetween. The element 1 is a metal plate member comprising: a main body (or base) 4; and inclined lateral faces 2 and 3 formed on lateral ends (in the direction of X-axis in FIG. 1) of the main body 4. The inclined faces 2 and 3 are contacted frictionally with a (V-shaped) groove 5a of one of the drive and the driven pulleys 5 of the continuously variable transmission to transmit the torque therebetween.

Specifically, the pulley 5 is a V-pulley in which a cross-section of the groove 5a thereof is V-shape. Therefore, the inclined faces 2 and 3 of the element 1 serve as flank face 2 and 3 for transmitting the torque between the pulley 5 and the V-belt B. According to the present invention, an inclination of an outer circumferential portion 2a (or 3a) of the inclined face 2 (or 3) is different from an inclination of an inner circumferential portion 2b (or 3b) of the inclined face 2 (or 3). However, details of the structure of the flank faces 2 and 3 will be explained later.

Columns 6 and 7 are integrally formed on both lateral ends of the main body 4 in a manner to protrude radially outwardly (i.e., upwardly in the direction of Y-axis in FIGS. 1 and 2). Therefore, a recess 8 opening toward the outer circumferential side of the V-belt B is formed by an upper face 4a as an upper edge of the main body 4 in FIGS. 1 and 2, and inner walls 6a and 7a of the columns 6 and 7 facing toward a width center of the main body 4.

In order to fasten an array of the elements 1 closely juxtaposed to each other in a circular manner by a belt-like ring 9, the ring 9 is inserted into the recess 8. Therefore, the upper face 4a of the main body 4 serves as a saddle face 4a to be contacted with an inner face of the ring 9 held in the recess 8 to fasten the element array. That is, in other words, the columns 6 and 7 are formed on each of the lateral ends of the saddle face 4a to protrude toward the outer circumferential side (i.e., upwardly in FIGS. 1 and 2).

The ring 9 is a layered ring formed by stacking a plurality of thin metal ring (called single ring) in the radial (or thickness) direction, and the ring 9 is divided into two rings 9a and 9b. The two rows of divided rings 9a and 9b are held parallel to each other in the recess 8, and kept in the stack by a tension of each of the single rings and friction acting between the single rings.

Latch portions 10 and 11 are individually formed on outer circumferential ends of the column 6 and 7, and protrusions 10a and 11a protrude individually from the latch portions 10 and 11 toward the width center of the main body 4. In other words, the latch portions 10 and 11 are individually formed on outer circumferential ends of inner walls 6a and 7a in a manner to protrude toward the width center of the recess 8. That is, a distance between the leading ends of the protrusions 10a and 11a is an opening width $W_1$ of the recess 8. Meanwhile, an inner width $W_2$ of the recess 8 between the inner walls 6a and 7a at a bottom 8a (i.e., saddle face 4a) side is wider than the opening width $W_1$ between the protrusions 10a and 11a.

As described, the ring 9 comprises the two rows of divided rings 9a and 9b. Therefore, the divided rings 9a and 9b can be overlapped thicknesswise partially in its length direction while keeping remaining portions parallel to each other.

Specifically, a width of each divided ring 9a and 9b, and dimensions of the recess 8 are determined to make a total width $D_1$ of the divided rings 9a and 9b aligned parallel to each other (i.e., a total width of the ring 9) wider than the opening width $W_1$ but narrower than the inner width $W_2$. Therefore, the total width of the ring 9 can be reduced temporarily to be narrower than the opening width $W_1$ by overlapping the divided rings 9a and 9b.

That is, the ring 9 can be fitted into the recess 8 from the overlapped portion of the divided rings 9a and 9b thorough the clearance between the protrusions 10a and 11a, i.e., through an opening 8b. After the overlapped portion of the divided rings 9a and 9b is thus fitted into the recess 8 from the opening 8b, the element 1 is moved to the portion where the rings 9a and 9b are aligned parallel to each other so that the rings 9a and 9b can be held individually by the latch portions 10 and 11 in the recess 8 while being aligned parallel to each other. Alternatively, it is also possible to align the partially overlapped rings 9a and 9b parallel to each other again in the recess 8. As a result, disengagement of the ring 9 from the recess 8 can be prevented.

As described, the V-belt B is formed by fastening the plurality of elements 1 juxtaposing annularly in the same orientation using the ring 9, and the V-belt B thus assembled is applied to the drive and driven pulleys 5. In case the V-belt B is applied to the pulleys 5, some of the elements 1 around the pulleys 5 are spread like a fan. That is, the elements 1 around the pulleys 5 have to be contacted tightly in this situation. For this purpose, as illustrated in FIGS. 1 and 2, a thickness of the element 1 is thinned at its lower portion (that is, at the portion close to the rotational center of the pulley 5).

Specifically, a front face 4f (i.e., a left face in FIG. 2) of the main body 4, is thinned gradually in the radial direction of the element 1 (i.e., in the vertical direction) from the saddle face 4a toward the inner circumferential side (i.e., toward the lower side). Therefore, the elements 1 around the pulleys 5 being spread like a fan, in other words, the elements 1 juxtaposed in a curved portion of the V-belt B around the pulleys 5 are contacted with each other at a boundary portion where the thickness of the element 1 is thus changed. That is, an edge of the boundary portion serves as a rocking edge 12.

The saddle face 4a of the element 1 is thus contacted with the ring 9 fastening the elements 1. Therefore, a contact pressure therebetween is increased in case the V-belt B is transmitting the torque. Especially, when the elements 1 moving ahead in a straight region enter into the groove of the pulley 5 and oscillated in the fan-like fashion, the ring 9 slides on the saddle face 4a and this will result in a generation of large frictional force. In this situation, if a vertical distance (in the radial direction) between the saddle face 4a and the rocking edge 12 is long, a moment resulting from such frictional force is increased. Consequently, a significant slippage between the ring 9 and the saddle face 4a is induced. In this case, frictional loss is increased when the V-belt B is driven, and transmission efficiency of the V-belt B is thereby degraded.

In order to avoid the above-explained disadvantage, in the V-belt B, the rocking edge 12 is formed on the front face 4f at the same level or substantially same level as the saddle face 4a in the vertical (or radial) direction of the element 1. Therefore, the moment resulting from the frictional force acting between the ring 9 and the saddle face 4a can be reduced as small as possible. For this reason, the frictional loss can be reduced when the V-belt B is driven so that the power transmission efficiency of the V-belt B can be improved.

A boss 13 and a hole 14 are respectively formed on each face of the main body 4 at the width center of the element 1. Specifically, the boss 13 of circular truncated cone is formed on the front face 4f of the main body 4. Meanwhile, the bottomed cylindrical hole 14 to which the boss 13 of the adjoining element 1 is inserted loosely is formed on a rear face 4r (that is, the right face in FIG. 2). Therefore, the elements 1 can be kept in line within a straight region of the driving belt B where the element 1 is not being contacted with the pulley 5. In other words, the boss 13 is formed to protrude from the front face 4f of the element 1, and the hole 14 is formed on the rear face 4r of another element 1 situated in front of the boss 13.

Thus, according to the element 1 of the V-belt B, both of the boss 13 and the hole 14 are formed on the element 1 in an inner circumferential side of the rocking edge 12 (i.e., lower side in FIGS. 1 and 2). In addition, the thickness of the element 1 is thinned at the portion on which the boss 13 and the hole 14 are formed, and thickened at an outer circumferential side of the rocking edge 12 (i.e., at an upper side in FIGS. 1 and 2). Therefore, when the ring 9 is pulled, the elements 1 juxtaposed in the straight region of the ring 9 are contacted with each other at the portion where the thickness thereof is thicker. Meanwhile, the elements 1 in the curved region of the ring 9 are spread like a fan and contacted with each other at the rocking edge 12. Therefore, in order to keep the boss 13 being inserted into the hole 14 of the adjoining element 1 in both straight and curved regions of the ring 9, the boss 13 is formed to protrude further than the thicker portion of the outer circumferential side of the rocking edge 12.

Thus, the elements 1 can be aligned in both radial (i.e., vertical) and width (i.e., horizontal) directions by inserting the boss 13 into the hole 14 of the adjoining element 1 in the straight region of the V-belt B. Therefore, chattering resulting from driving the V-belt B applied to the pulleys 5 can be prevented so that the continuously variable transmission using the V-belt B can be driven smoothly.

However, in case of applying a thrust force to the pulley 5 to drive the belt-type continuously variable transmission, in other words, in case the V-belt B is clamped by the pulley 5, a pushing load resulting from a reaction force of the ring 9 is applied to the element 1 in the radial direction toward a center axis of the pulley 5. As a result, the element 1 is deformed to be compressed widthwise, and an angle between the flank faces 2 and 3 becomes smaller, that is, an opening angle of V-shaped or trapezoidal shaped cross section of the element 1 becomes smaller. In this situation, each contact point between the pulley 5 and the element 1, that is, a power transmitting point between the pulley 5 and the V-belt B is displaced toward the inner circumferential side of the flank face from the initial point. As a result, a power transmitting capacity, that is, a torque transmission capacity and a power transmitting efficiency between the pulley 5 and the V-belt B are degraded.

The above explained disadvantage can be solved by increasing the angle between the flank faces 2 and 3 to be wider than the opening angle of the V-shaped groove 5a of the pulley 5. However, in this case, the element 1 is clamped by the pulley 5 unevenly at each of the outer circumferential portion (i.e., an upper portion) of the flank faces 2 and 3. That is, in this situation, the columns 6 and 7 of the element 1 are subjected to a bending moment at the points contacted with the pulley 5 to be bent toward the width center. As a result, durability of the element 1 is deteriorated.

In order to avoid the above-explained disadvantage, according to the present invention, an angle between the outer circumferential portion 2a of the flank face 2 and the outer circumferential portion 3a of the flank face 3 is differentiated from an angle between the inner circumferential portion 2b of the flank face 2 and the inner circumferential portion 3b of the flank face 3. In other words, the V-belt B has different trapezoidal angles at the outer circumferential portion of the element 1 and at the inner circumferential portion of the element 1.

Specifically, each of the flank faces 2 and 3 is divided into the outer circumferential portion 2a and 3a and the inner circumferential portion 2b and 3b by a boundary line L situated at the same level as the saddle face 4a in the radial direction. In other words, the portion of the flank face 2 situated in the outer circumferential side of a boundary portion 2c is the outer circumferential portion 2a, and the portion of the flank face 2 situated in the inner circumferential side of the boundary portion 2c is the inner circumferential portion 2b. Likewise, the portion of the flank face 3 situated in the outer circumferential side of a boundary portion 3c is the outer circumferential portion 3a, and the portion of the flank face 3 situated in the inner circumferential side of the boundary portion 3c is the inner circumferential portion 3b.

In the element 1 thus structured, an angle θ2 between the inner circumferential portions 2b and 3b of the flank faces 2 and 3 is larger than an angle θ1 between the outer circumferential portions 2a and 3a. In other words, θ1 is the angle between oblique sides of a trapezoid in which a line segment connecting the boundary portion 2c and 3c is an upper base thereof, and in which a line segment connecting the outer circumferential end 2d of the outer circumferential portion 2a and the outer circumferential end 3d of the outer circumferential portion 3a is a lower base thereof. On the other hand, θ2 is the angle between oblique sides of a trapezoid in which a line segment connecting the boundary portion 2c and 3c is a lower base thereof, and in which a line segment connecting an inner circumferential end 2e of the inner circumferential portion 2b and an inner circumferential end 3e of the inner circumferential portion 3b is an upper base thereof. Thus, the flank faces 2 and 3 are formed to have different angles between the outer circumferential portions 2a and 3a, and between the inner circumferential portions 2b and 3b.

In addition, the above-explained angle θ1 between the outer circumferential portions 2a and 3a is substantially identical to the open angle θ0 of the V-shaped groove 5a of the pulley 5, that is, identical to a trapezoidal angle of the cross-section of the V-shaped groove 5a. Alternatively, the angle θ1 between the outer circumferential portions 2a and 3a may also be reduced to be slightly smaller than the open angle θ0 of the V-shaped groove 5a. Thus, the angle θ1 is identical to the open angle θ0 or slightly smaller than the open angle θ0.

Meanwhile, the above-explained angle θ2 between the inner circumferential portions 2b and 3b is slightly wider than the open angle θ0 of the V-shaped groove 5a of the pulley 5. However, the angle θ2 is smaller than a total angle of: the open angle θ0; and an angle corresponding to a shrinkage of the angle between the flank faces 2 and 3 (that is, a shrinkage of an average angle of θ1 and θ2), in case the element 1 is compressed widthwise when setting the maximum speed change ratio of the continuously variable transmission and the maximum transmittable torque of the V-belt B is therefore applied to the pulley 5.

More specifically, the angle θ2 between the inner circumferential portion 2b of the flank face 2 and the inner circumferential portion 3b of the flank face 3 is set within a range of:

$$\theta 0 < \theta 2 < \theta 0 + \alpha$$

where α represents a reduction angular amount of the angle between the flank faces 2 and 3 in case the element 1 is compressed widthwise.

The angle α can be obtained by the following formula:

$$\alpha = \{(L^2 + 2LW - 2W^2) \cdot F/(24EI)\} \cdot 2$$

where L represents the maximum width of the element 1, W represents a width between the columns 6 and 7, F represents a pushing load to be applied to the element 1 by the ring 9 in case the maximum transmittable torque of the V-belt B is applied to the pulley 5 when setting the maximum speed change ratio of the continuously variable transmission, I represents a second moment of area of the element 1, and E represents Young's module of material of the element 1. Specifically, the angle α is set to approximately 0.6 degrees.

In addition, a wavy face 15 is formed on each of the flank faces 2 and 3. Therefore, lubricant oil can be held between each of the flank face 2 and 3 and the V-shaped groove 5a to cool and lubricate therebetween. Specifically, a plurality of fine grooves having several tens μm depth are formed on the flank faces 2 and 3 in the thickness direction at intervals of approximately 1 mm or smaller. More specifically, as emphatically illustrated in FIG. 1, a cross section of the groove is arcuate whose curvature radius is approximately 0.1 to 0.2 mm. That is, the groove is a concave curve whose curvature radius is approximately 0.1 to 0.2 mm.

In order to avoid stress concentration resulting from a notching effect by an edge formed between the concave faces, the wavy face 15 is formed by alternately forming the concave curves and convex curves on each of the flank face 2 and 3. In addition, the wavy face 15 is formed entirely on each of the flank faces 2 and 3 in a longitudinal direction between the inner and outer circumferential ends thereof.

However, in the wavy face 15 thus formed, a configuration of the convex curve formed at the center of each of the flank faces 2 or 3 in the radial direction, that is, a configuration of each of the convex curves formed on the boundaries between the outer circumferential portion 2a and the inner circumferential portion 2b, and between the outer circumferential portion 3a and the inner circumferential portion 3b are different from that of the remaining convex curves. Specifically, only a curvature radius of the convex curve 15a formed on the boundary line L situated at the level of the saddle face 4a is larger than that of the remaining convex faces in the wavy face 15. Thus, the wavy faces 15 are formed over the entire length of the flank faces 2 and 3, and the convex curves 15a having larger curvature radius are formed on the boundary portions 2c and 3c of the flank faces 2 and 3.

That is, the convex curve 15a is formed to reduce a stress concentration factor at a base portion of each of the column 6 and 7 around the boundary line L where the bending stress is concentrated. For this purpose, in the example shown in FIG. 1, a curvature radius R2 of the convex curve 15a formed on each of the boundary portions 2c and 3c is larger than a curvature radius R1 of the remaining convex curves formed on the inner and outer circumferential portions 2b and 2a of the flank face 2, and the inner and outer circumferential portions 3b and 3a of the flank face 3.

Thus, according to the V-belt B of the present invention, the inclinations of the outer circumferential portions 2a and 3a of the flank faces 2 and 3 are identical to or slightly smaller than those of inner surfaces of the groove 5a of the pulley 5. Therefore, the outer circumferential portions 2a and 3a can be contacted with the groove 5a of the pulley 5 planewise under the situation in which the element 1 of the V-belt B is compressed widthwise by the pulley 5. For this reason, the flank faces 2 or 3 will not be subjected to the load from the pulley 5 unevenly at the outer circumferential portions 2a and 3a so that the columns 6 and 7 of the element 1 can be prevented from being subjected to a significant bending moment.

In addition, the inclinations of the inner circumferential portions 2b and 3b of the flank faces 2 and 3 are slightly larger than those of the inner surfaces of the groove 5a of the pulley 5. Therefore, the inner circumferential portions 2b and 3b of the flank faces 2 and 3 are contact with the groove 5a of the pulley 5 substantially planewise after the outer circumferential portions 2a and 3a of the flank faces 2 and 3 are compressed widthwise. For this reason, even if the element 1 is deformed by the load from the pulley 5, the flank faces 2 and 3 can be prevented from being contacted unevenly with the groove 5a of the pulley 5, and stress concentration on the flank faces 2 and 3 can be relaxed. As a result, durability of the V-belt B can be improved by thus preventing deterioration of the durability of the element 1.

Further, the wavy face 15 is formed on each of the flank faces 2 and 3 thicknesswise to hold lubricant oil therebetween. As described, the angle between the outer circumferential portions 2a and the groove 5a is different from the angle between the inner circumferential portion 2b and the groove 5a, and the angle between the outer circumferential portions 3a and the groove 5a is different from the angle between the inner circumferential portion 3b and the groove 5a. That is, the inclinations of the flank face 2 and 3 are individually changed at the boundary portion 2c and 3c. Therefore, the boundary portions 2c and 3c as the base portions of the columns 6 and 7 are subjected to uneven load from the pulley 5, and a stress is also concentrated thereto. However, according to the present invention, the curvature radius of the convex curves 15a formed individually on the boundary portions 2c and 3c is larger than that of the remaining convex curves. Therefore, the contact pressure between each of the boundary portions 2c and 3c and the groove 5a of the pulley 5 can be reduced. For this reason, a durability of the element 1 will not be deteriorated even at the boundary portions 2c and 3c as the base portions of the columns 6 and 7, that is, even at the corners between the column 6 and the saddle face 4a and between the column 7 and the saddle face 4a.

The present invention should not be limited to the examples thus far explained. For example, in the above-explained examples, the V-belt B is applied to a belt-type continuously variable transmission. However, the V-belt B of the present invention can also be applied to other kinds of belt-type transmission mechanisms using a belt and pulleys.

The invention claimed is:

1. A V-belt, comprising:
a plate member having a saddle face, a column extending radially outwardly from each lateral end of the saddle face, and a flank face formed on each lateral end of the column to be contacted with a groove of a V-pulley to transmit power; and
a ring disposed on the saddle face to fasten an array of the plate members being juxtaposed annularly in a manner to orient the saddle face to an outer circumferential side,
wherein an angle between outer circumferential portions of the flank faces of the plate member is substantially identical to or smaller than an open angle of the groove of the V-pulley,
an angle between inner circumferential portions of the flank faces of the plate member is larger than the angle between the outer circumferential portions of the flank faces of the plate member, and
the inner circumferential portion of the flank face of the plate member is contacted with the groove of the V-pulley when the plate member is compressed by a load applied from the V-pulley.

2. The V-belt as claimed in claim 1, wherein:
at least the inner circumferential portion of the flank face is formed to be contacted with the groove of the V-pulley planewise under the situation in which the plate member is deformed by a load from the V-pulley.

3. The V-belt as claimed in claim 2, wherein:
a level of a boundary between the outer and the inner circumferential portions of the flank face is situated at a same level as the saddle face in the radial direction.

4. The V-belt as claimed in claim 1, further comprising:
a wavy face, which is formed on the flank face by forming a convex face and a concave face alternately in a longitudinal direction between an outer circumferential end and an inner circumferential end of the flank face; and
wherein a curvature of the convex face formed at a boundary between the outer and the inner circumferential portions of the flank face is larger than those of the other convex faces.

5. The V-belt as claimed in claim 4, wherein:
a level of the boundary between the outer and the inner circumferential portions of the flank face is situated at a same level as the saddle face in the radial direction.

6. The V-belt as claimed in claim 1, wherein:
a level of a boundary between the outer and the inner circumferential portions of the flank face is situated at a same level as the saddle face in the radial direction.

7. The V-belt as claimed in claim 1, wherein:
the ring is inserted in a recess, the recess opening toward the outer circumferential side of the V-belt and being formed by the saddle face and inner walls of the columns facing toward a width center of a main body of the plate member.

8. The V-belt as claimed in claim 7, wherein:
latch portions are individually formed on outer circumferential ends of the columns, and protrusions protrude individually from the latch portions toward the width center of the main body of the plate member.

9. The V-belt as claimed in claim 8, wherein:
a distance between leading ends of the protrusions presents an opening width of the recess,
a distance between the inner walls of the columns at a saddle face side of the recess presents an inner width of the recess, and
the inner width of the recess is greater than the opening width of the recess.

10. The V-belt as claimed in claim 9, wherein:
the ring comprises first and second divided rings, and
a total width of the divided rings aligned parallel to each other is greater than the opening width of the recess and is less than the inner width of the recess.

11. The V-belt as claimed in claim 1, wherein:
a boss is formed on a first face of a main body of the plate member at a width center thereof and a hole is formed on a second face of the main body of the plate member at the width center thereof.

12. The V-belt as claimed in claim 11, wherein:
the boss and the hole are formed on the plate member at an inner circumferential side of a rocking edge of the plate member, the rocking edge being formed on the first face of the main body at a substantially same level as the saddle face in a vertical direction.

13. The V-belt as claimed in claim 12, wherein:
a thickness of the plate member at an outer circumferential side of the rocking edge is greater than a thickness of the plate member at the inner circumferential side of the rocking edge.

* * * * *